United States Patent [19]

Cressman

[11] 3,738,791
[45] June 12, 1973

[54] ARC-GAP CONSTRUCTION FOR FLASHING HIGH-VOLTAGE PHOTOFLASH LAMPS

[75] Inventor: George W. Cressman, Chagrin Falls, Ohio

[73] Assignee: General Electric Company, Schenectady, N.Y.

[22] Filed: July 22, 1971

[21] Appl. No.: 165,133

[52] U.S. Cl. .................................................. 431/95
[51] Int. Cl. ............................................. F21k 5/02
[58] Field of Search .................. 431/93, 95, 92, 94; 315/323, 169; 95/11.5; 313/220

[56] References Cited
UNITED STATES PATENTS

| 3,629,638 | 12/1971 | Veron | 313/220 |
| 3,617,796 | 11/1971 | Caras | 315/169 |
| 3,528,354 | 9/1970 | Nakagawa | 431/95 X |
| 3,532,931 | 10/1970 | Cote et al. | 431/95 X |

Primary Examiner—William F. O'Dea
Assistant Examiner—Paul Devinsky
Attorney—Norman C. Fulmer, Henry P. Truesdell, Frank L. Neuhauser et al.

[57] ABSTRACT

A construction of arc gaps in series with high-voltage photoflash lamps, for improving reliability of flashing and for causing sequential flashing of lamps of an array of flash lamps, by means of high-voltage firing pulses such as are produced by impacting a piezoelectric element in synchronism with the opening of a camera shutter. The arc gaps comprise a pair of electrodes spaced apart by an intervening member of dielectric material providing parallel dielectric and air paths between the electrodes.

12 Claims, 3 Drawing Figures

PATENTED JUN 12 1973

3,738,791

Inventor:
George W. Cressman
by Norman C. Fulmer
His Attorney

ARC-GAP CONSTRUCTION FOR FLASHING HIGH-VOLTAGE PHOTOFLASH LAMPS

CROSS-REFERENCE TO RELATED APPLICATION

Pat. application, Ser. No. 127,562, Paul T. Cote, filed Mar. 24, 1971 and assigned to the same assignee as the present patent application.

BACKGROUND OF THE INVENTION

The invention is in the field of circuits and devices for flashing photoflash lamps, and is particularly directed to arc-gap constructions for flashing high-voltage lamps from high-voltage firing pulses such as are produced by impacting or otherwise stressing a piezoelectric element in synchronism with the opening of a camera shutter. The arc-gap constructions of the invention are useful for flashing individual photoflash lamps, and also are useful for causing selective or random sequential flashing of the individual lamps of an array of flash lamps.

Photoflash lamps may be classified generally into two voltage types: low-voltage and high-voltage. The low-voltage types usually are intended to be flashed by a battery, or a charged capacitor, having a voltage of about 1.5 volts to 15 volts, whereas the high-voltage flash lamps are intended to be flashed by a firing pulse of a few hundred volts or greater such as can be produced by a piezoelectric element.

Low-voltage flash lamps have achieved commercial success, and various mechanisms have been developed for flashing individual lamps, and also for flashing, one-at-a-time, lamps of a multiple-lamp arrangement such as the popular flashcube. Also, various designs have been proposed for an array of flash lamps having reflectors associated therewith for directing the light from all of the lamps in the same direction. Various switching mechanisms and circuits have been devised for causing the lamps of the array to flash, one-at-a-time, each time a camera shutter is opened to take a picture. An advantage of such an array is that it need not be moved or rotated between flashes as is the case with the flashcube.

High-voltage flash lamps, in contrast to the low-voltage type, have not achieved appreciable commercial success, in spite of their important advantageous capability of being flashed by means of a small, light-weight, and long-life piezoelectric element and hence not requiring the use of heavy and bulky batteries with their attendant drawbacks such as requiring recharging or replacement and which frequently fail to provide adequate firing pulse energy due to their connections being loose, dirty, oxidized or corroded. An obstacle in the path of commercial success of the high-voltage type of flash lamp, is that many switching mechanisms and firing circuits usable for low-voltage lamps are unsuited or unfeasible for use with high-voltage lamps. Also, the rate-of-rise time of firing pulses produced by a piezoelectric element tends to be somewhat too slow for insuring optimum flashability of typical flash lamps. The patent application cross-referenced above, is directed to arc-gap circuits providing improved flash capability, and sequential flashing, of high-voltage flash lamps.

SUMMARY OF THE INVENTION

Objects of the invention are to provide improved arc-gap arrangements for reliably flashing high-voltage flash lamps, and to provide arc-gap arrangements for causing sequential individual flashing of the lamps of an array of high-voltage flash lamps, from sequential high-voltage firing pulses produced in synchronism with a camera shutter each time a flash picture is to be taken.

The invention comprises, briefly and in a preferred embodiment, an arc-gap construction in electrical series combination with a high-voltage flash lamp, this series combination being adapted for connection across a source of high-voltage firing pulses, the arc-gap construction comprising a pair of spaced electrodes and a member of dielectric material interposed partially between the electrodes to provide parallel dielectric and air gaps between the electrodes. Preferably, the electrodes are in contact with and are spaced apart by the dielectric material, and the dielectric material is provided with an opening therethrough to provide the parallel air gap. An embodiment of the invention comprises a plurality of high-voltage flash lamps, and a plurality of arc gaps of differing voltage breakdown characteristics respectively connected in series combinations with the flash lamps, these series combinations being connected in a parallel combination adapted for connection across a source of high-voltage firing pulses, said arc gaps comprising an elongated common electrode and a plurality of individual electrodes connected to respective lamps and arranged transversely to the common electrode along the length thereof and spaced therefrom by dielectric members of relatively different thicknesses.

DESCRIPTION OF THE PREFERRED EMBODIMENT

Figure 1:
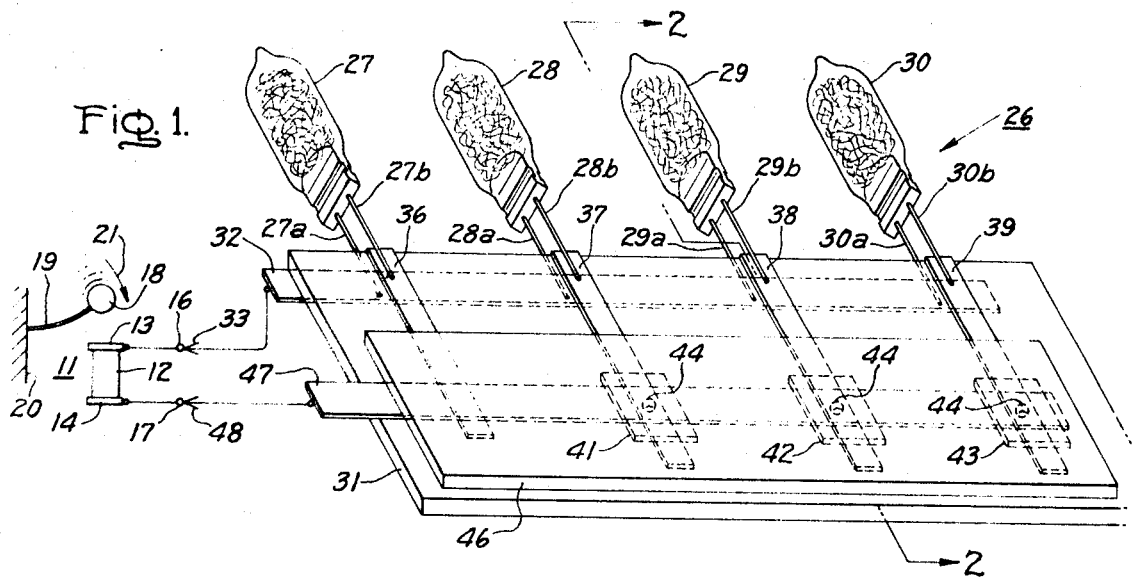
FIG. 1 is a perspective view of a preferred embodiment of the invention.

In FIG. 1, a source 11 of firing pulse energy comprises a piezoelectric element 12 which may be in the form of a small cylinder having electrodes 13 and 14 at the top and the bottom thereof, connected respectively to firing pulse terminals 16 and 17. An impactor 18 is carried at the end of an elongated spring 19, the other end of which is fixed by means 20 which may be carried by a camera housing or in a shutter mechanism. The impactor 18 may be arranged to be raised away from the piezoelectric element 12 when the camera shutter is cocked, and released upon opening of the shutter to take a picture where upon the spring 19 urges the impactor 18 in the direction of the arrow 21 so as to impact against the piezoelectric element 12 thereby producing a firing pulse at the terminals 16 and 17. The piezoelectric element 12 may be, for example, approximately one-eighth inch in diameter and one-fourth inch long, and may be made from barium titanate, lead metaniobate, PZT (lead-zirconium-titanate) or other suitable piezoelectric material. Further details of piezoelectric means for producing photoflash firing pulses, and camera synchronizing means, are disclosed in U.S. Pats. Nos. 2,972,937 and 3,106,080, both to Chauncey G. Suits and assigned to same assignee as the present invention.

An arc-gap and photoflash lamp array unit 26, comprises a plurality of high-voltage photoflash lamps 27, 28, 29, and 30 which may be of the type having a glass envelope and containing shreaded metal foil, and provided with a pair lead wires 27a and 27b; 28a and 28b; etc., extending from each flash lamp. In one type of suitable high-voltage flash lamp, the lead wires are connected to electrodes inside the lamp, one or both of these electrodes being coated with a primer material, the shreaded metal foil in the lamp being in contact with one or both of the electrodes and/or their primer coatings, so as to complete the electrical circuit between the electrodes. When a firing pulse is applied to the lead wires, the circuit is completed through the shreaded metal foil whereby numerous sparks occur in the primer material, thereby igniting the primer and causing the lamp to flash. Further details of such a high-voltage photoflash lamp are disclosed in U.S. Pat. No. 2,868,003 to Warren F. Albrecht and assigned to the same assignee as the present invention. Such a lamp may be flashed by means of a firing pulse of approximately 500 volts or greater. Filament-type flash lamps may be employed, if the filament is of sufficiently high resistance for causing the lamp to be flashed by a high-voltage, low-current firing pulse.

A sheet or strip-like base member 31 of electrically insulating material such as plastic, is provided with an elongated electrical conductor 32 on the lower surface near an edge thereof, as shown. The flash lamps 27–30 are arranged in a row along the base member 31, with the a lead wire of each lamp electrically connected to the con-ductor strip 32, which is connected to a contact 33 adapted to be plugged into or otherwise engage the firing pulse terminal 16. A plurality of reflectors, not shown, are arranged behind the flash lamps 27–30, in the completed device, so as to direct the light of all the flash lamps, when flashed, in a same given direction.

A plurality of elongated electrical conductor strips 36, 37, 38, and 39 are carried on the upper surface of the base member 31, and extend transversely with respect to the common conductor strip 32, as shown, and are respectively electrically connected to the b lead wires of the flash lamps. A plurality of small sheet-like dielectric spacers 41, 42, and 43 are respectively positioned over the transverse conductor strips 37, 38, and 39, each of these dielectric spacers being provided with an opening 44 therethrough positioned over the respective transverse conductor strip.

A sheet or strip-like covering member 46 is provided with an elongated electrical conductor strip 47 on the underside thereof, and is positioned over the base member 31 so that the conductor strip 47 extends across the transverse conductor strips 36–39 so as to be in direct electrical contact with the first transverse conductor strip 36, and against the upper surfaces of the dielectric spacers 41, 42, and 43. The conductor strip 47 is electrically connected to a contact member 48 adapted to plug into or otherwise electrically engage the firing pulse terminal 17. The cover member 46 may be heat-sealed, or otherwise bonded or attached to the base member 31, as most clearly shown in FIG. 2, to provide a sealed unit and to insure that the upper conductor strip 47 will be in snug engagement against the transverse conductor strip 36 and the dielectric spacers 41, 42 and 43.

In the drawing, the conductor strips and dielectric spacers are shown in exaggerated thickness, for clarity of illustration, whereas in a preferred embodiment these elements are so thin that in the final assembly the cover member 46 and base member 31 will both be substantially flat even though bonded or otherwise attached together as described above. For example, the conductor strips need be only a few thousands of an inch thick and may be vapor deposited or otherwise attached to the surfaces of the base member 31 and cover member 46.

Figure 2:
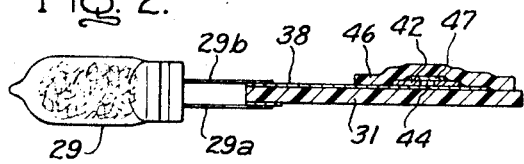
FIG. 2 is a cross-sectional view taken on the line 2—2 of FIG. 1.

As shown in FIGS. 1 and 2, the upper common connector strip 47 is positioned so that the openings 44 through each of the dielectric spacers 41, 42, and 43 will extend between the respective conductors, which function as arc-gap electrodes, so that each of the three arc gaps consists of a pair of electrodes spaced apart by a dielectric spacer member which provides parallel dielectric and air paths between the electrodes. The dielectric material from which the arc-gap spacers 41, etc., are made, may be any of a number of suitable solid dielectric materials such as polyvinyl fluoride, polyvinylidene fluoride, cellulose triacetate, and cellulose acetatebutyrate. If the dielectric spacers 41, etc. are all of the same material, they should be of differing thicknesses so as to provide differing voltage breakdown characteristics. For example, in one embodiment of the invention, the dielectric spacers 41, 42, and 43 are made from cellulose triacetate, each of the spacers being about one-fourth inch square, and each provided with a 0.025 inch diameter hole through the center thereof, one of the spacers 41 having a thickness of 0.001 inch, another spacer 42 having a thickness of 0.003 inch, and the third spacer 43 having a thickness of 0.005 inch, the arc-gap electrodes 37, 38, 39, and 47 comprising 0.003 inch thick phosphor bronze, vapor coated with aluminum. With such a construction, it was found that the thinner arc-gap at 41 will break down at 700 volts, the next thicker arc gap at 42 will break down at 1,000 volts, and the third arc gap at 43 will break down at about 1,300 volts. Thus, firing pulses of about 1,500 to 2,000 volts, produced by the piezoelectric firing pulse generator 11, will be adequate to sequentially flash all of the lamps. More than four lamps can be employed, by adding additional arc gaps employing successively thicker dielectrics, or alternatively, more flash lamps and arc gaps may be employed, by using relatively smaller incremental steps of increasing thickness for the dielectric spacers. Also, differing dielectric materials may be employed, all of the same thickness, instead of all of the spacers being of the same material but differing thicknesses or a combination of different materials and different thickness may be employed.

The embodiment shown in FIGS. 1 and 2 operates as follows. The flash lamp array unit 26 is plugged into or otherwise attached to a camera or flash adapter device, with the connectors 33 and 48 in electrical contact with the firing pulse terminals 16 and 17. Upon the first occurrance of a firing pulse, in synchronization with the opening of a camera shutter, the first flash lamp 27 will flash, since it is connected directly across the source of firing pulse. The firing pulse energy is not sufficient, however, to cause breakdown of any of the arc gaps in the circuit while flashing the lamp 27. After being flashed, the lamp is an open circuit or a very high resistance. Upon the occurrance of a second firing pulse, the lowest-voltage arc gap, for instance the arc gap formed by the dielectric 41, will break down and the second lamp 28 will flash. When the next firing pulse occurs, the remaining unflashed lamp which is connected to the pulse source through the lowest voltage breakdown arc gap will be the next to flash, etc. After an arc gap breaks down, during the arcing, the arc voltage drop is low, only a few volts for example, so that substantially the full energy of the firing pulse is applied to the lamp being flashed.

It has been found that constructing the arc gaps in the manner described, i.e., with the arc gap electrodes spaced apart by a dielectric so as to form parallel dielectric and air paths between the electrodes, achieves at least two advantageous improvements in performance over air gaps: the arc gaps will break down and become conductive at a relatively lower voltage for a given spacing between the electrodes; and, secondly, the voltage breakdown value for each arc gap remains quite consistently and reliably at or near the desired value, whereas with an air arc gap there is considerable variation in breakdown voltage for any given spacing between the electrodes. These beneficial results achieved with the parallel dielectric and air gap paths are believed to be due at least in part to the fact that the dielectric material between the electrodes determines, with considerable consistency, the breakdown voltage of the arc gap, and when the gap does break down, the arc occurs through the air space between the electrodes, i.e., through the opening 44 in the dielectric spacer in the embodiment shown in the drawing. The consistency of the breakdown voltage value as provided by the dielectric material being between the electrodes, may be due to some sort of ionic or other charge developed in the dielectric which charge in turn determines a consistent breakdown voltage value for the arc gap.

Figure 3:
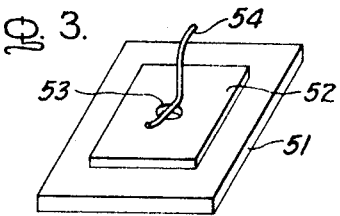
FIG. 3 is a perspective view of an alternative arc-gap construction in accordance with the invention.

FIG. 3 illustrates an alternative embodiment of the invention comprising a flat electrically conductive plate 51 which functions as one electrode of the arc gap, a dielectric spacer member 52 being positioned over and against the surface of the electrode 51 and provided with a hole or opening 53 therethrough, and a second electrode 54 in the form of an elongated wire shaped to engage against the upper surface of the dielectric spacer 52 and extend across the top of the opening 53, thus forming a pair of electrodes spaced apart by the dielectric 52 so as to provide parallel dielectric and air paths between the electrodes 51 and 54. In an array of flash lamps, a plurality of arc gaps as shown in FIG. 3 may be employed and connected electrically into a circuit like that shown in FIG. 1, or the flat electrode 51 may comprise an elongated conductor strip similar to the strip 47 shown in FIG. 1, and the electrodes 54 may respectively comprise the $b$ lead wires of the various flash lamps bent to shape and cemented or otherwise attached to the top surface of the dielectric spacer 52.

The rate-of-rise time of firing pulses produced by some piezoelectric elements tends to be somewhat too slow for optimum flashing reliability of certain kinds of flash lamps, and therefore with certain combinations of firing pulse sources and flash lamps it is advantageous to interpose a thin dielectric spacer between the conductor strips 36 and 47 to provide an arc gap in series with the first lamp 27. Since the arc gap applies the firing pulse to the lamp only after it has reached an appreciable voltage value, in effect it increases the rate-of-rise of the pulse thus improving flash reliability.

A dual-sided flash array can be made with two arrays 26 arranged with their lamps and reflectors in back-to-back intermeshed relationship.

The arc-gap flash array construction of the invention is economical to manufacture, and reliable in operation.

While preferred embodiments of the invention have been shown and described, other embodiments and modifications thereof will become apparent to persons skilled in the art, and will fall within the scope of invention as defined in the following claims.

What is claimed as new and desired to be secured by Letters Patent of the United States is:

1. An arc-gap construction for flashing a high-voltage photoflash lamp, comprising a pair of spaced apart arc-gap electrodes, a member of solid dielectric material interposed partially between said electrodes to provide parallel solid dielectric and air gaps between the electrodes, and means connecting said electrodes and photoflash lamp in electrical series.

2. An arc-gap construction as claimed in claim 1, in which said member of solid dielectric material extends between and in contact with both of said electrodes.

3. An arc-gap construction as claimed in claim 2, in which said electrodes comprise substantially flat mutually facing surfaces, said member of solid dielectric material comprising a sheet-like dielectric member positioned between said mutually facing surfaces and being provided with an opening therethrough extending from one to the other of said mutually facing surfaces so as to define said parallel air gap.

4. An arc-gap construction as claimed in claim 3, in which said opening through the dielectric member is substantially centrally located with respect to said mutually facing electrode surfaces.

5. An arc-gap construction as claimed in claim 2, in which a first one of said electrodes comprises a substantially flat surface, said member of solid dielectric material comprising a sheet-like dielectric member positioned against said electrode surface and provided with an opening therethrough perpendicular to the plane of said electrode surface, the other of said electrodes comprising a wire-like member positioned against the surface of said dielectric member on the other side thereof from said first electrode and extending across said opening.

6. An arc-gap construction as claimed in claim 1, including a piezoelectric firing pulse generator, and means connecting the series combination of said photoflash lamp and arc gap electrodes across the output of said piezoelectric firing pulse generator.

7. An arc-gap construction for causing sequential flashing of a plurality of high-voltage photoflash lamps by means of sequential firing pulses, comprising a plurality of pairs of arc-gap electrodes, the electrodes of each of said pairs thereof being spaced apart by a solid dielectric member positioned therebetween so as to provide parallel solid dielectric and air gaps between the spaced apart electrodes, said solid dielectric members providing differing voltage breakdown values for said pairs of arc gap electrodes, means connecting said pairs of arc gap electrodes respectively in series with said photoflash lamps thereby forming a plurality of series combinations, and means connecting said series combinations in an electrical parallel combination adapted to be connected across a source of said firing pulses.

8. An arc-gap construction as claimed in claim 7, in which said solid dielectric members have relatively different thicknesses thereby providing said differing voltage breakdown values.

9. An arc-gap construction as claimed in claim 7, in which said solid dielectric members are made from different dielectric materials thereby providing said differing voltage breakdown values.

10. An arc-gap construction as claimed in claim 7, in which said plurality of photoflash lamps are arranged in a row, each of said photoflash lamps having a pair of lead wires, means connecting electrically together a first lead wire of each photoflash lamp, a first elongated electrical conductor positioned in spaced parallel relationship to said row of photoflash lamps and serving as an electrode for each of said pairs of arc-gap electrodes, and a plurality of elongated conductors respectively extending from the remaining lead wires of the photoflash lamps and crossing said first elongated conductor transversely with respect thereto and respectively spaced therefrom by said solid dielectric members and respectively serving as the second electrode of each said pairs of electrodes.

11. An arc-gap construction as claimed in claim 10, in which each of said solid dielectric members comprises a sheet-like member provided with an opening therethrough extending from one to the other of the electrodes between which the dielectric member is positioned.

12. An arc-gap construction as claimed in claim 11, including an elongated base member, said means connecting together a first lead wire of each photoflash lamp comprising an elongated conductor carried on one side of said base member, said plurality of elongated conductors comprising elongated conductor strips carried on the other side of said base member and respectively connected electrically to said remaining lead wires of the photoflash lamps, an elongated cover member, said first elongated electrical conductor comprising an elongated conductor strip carried on a side of said cover member, said cover member being positioned over said base member so that said first elongated conductor strip faces toward and crosses said plurality of elongated conductor strips and is spaced therefrom by said solid dielectric members.

* * * * *